Nov. 13, 1962     Z. C. POSSIS ETAL     3,063,212
TAPING MACHINE Filed Oct. 20, 1960     10 Sheets-Sheet 1

INVENTORS
ZINON C. POSSIS
MELVIN J. STRAUB
FLOYD LOBASH
WILBERT E. JOHNSON
CLARENCE E. SOLEM

By Moore, White & Burd ATTORNEYS

Nov. 13, 1962  Z. C. POSSIS ETAL  3,063,212
TAPING MACHINE
Filed Oct. 20, 1960  10 Sheets-Sheet 2

Nov. 13, 1962  Z. C. POSSIS ETAL  3,063,212
TAPING MACHINE
Filed Oct. 20, 1960  10 Sheets-Sheet 3

INVENTORS
ZINON C. POSSIS
MELVIN J. STRAUB
FLOYD LOBASH
WILBERT E. JOHNSON
CLARENCE E. SOLEM

By Moore, White & Deed ATTORNEYS

Nov. 13, 1962    Z. C. POSSIS ETAL    3,063,212
TAPING MACHINE
Filed Oct. 20, 1960    10 Sheets-Sheet 4

INVENTORS
ZINON C. POSSIS
MELVIN J. STRAUB
FLOYD LOBASH
WILBERT E. JOHNSON
CLARENCE E. SOLEM
By Moore, White & Burd ATTORNEYS

FIG. 8

INVENTORS
ZINON C. POSSIS
MELVIN J. STRAUB
FLOYD LOBASH
WILBERT E. JOHNSON
CLARENCE E. SOLEM
By Moore, White & Reed ATTORNEYS

United States Patent Office 3,063,212
Patented Nov. 13, 1962

3,063,212
TAPING MACHINE
Zinon C. Possis, Minneapolis, Melvin J. Straub, Hopkins, and Floyd Lobash, Wilbert E. Johnson, and Clarence E. Solem, Minneapolis, Minn., assignors to Possis Machine Corporation, Minneapolis, Minn., a corporation of Minnesota
Filed Oct. 20, 1960, Ser. No. 63,817
17 Claims. (Cl. 53—198)

This invention is a novel machine for applying tape to bundles of wires and the like. It is believed to be novel in having a plurality of rubber rollers in a common rotatable carrier one of which is fixed and the others spring spring loaded which receive the wires and tape and wrap the tape around the wires by rotating around it.

A further novel feature is the fact that the fixed one of the three rubber rollers may be adjusted to determine the size of a bundle which the machine will accept and the adjustment of the fixed roller automatically correctly determines the position of the spring loaded rollers.

It is further believed novel in having a narrowed surface to which the tape is secured prior to being transferred to the wire which surface holds the tape without undue resistance to being removed when the wires are applied to the tape.

It is further novel in having a sliding tape presenting structure which moves the tape away from the cutting apparatus before the tape is applied to the wires.

A still further novel feature of the device is an air blast which straightens out the end of the tape supply for the next application of tape before the tape holder is pulled away from the cutting structure.

A still further novel structure may be found in the means for interconnecting all of the mechanism to drive on a single operating cylinder with the exception of the motive power required to rotate the rubber roller carrier.

Accordingly it is an important object of this invention to provide a novel tape applying machine.

A still further object of this invention is to provide a tape applying machine which cuts a predetermined length of tape and then moves it into a position to be readily applied to material to be taped.

It is another object of this invention to provide a tape applying machine which cuts and holds a length of tape to be applied without unduly resisting the attachment of the tape to the material to be taped and the disengagemen of the tape from its holding structure.

A still further object of this invention is to provide a taping machine which can be adjusted to accept and apply tape to units of differing diameters.

It is another object of this invention to provide a tape applying machine that requires a minimum of power units to operate it.

It is yet another object of this invention to provide a taping machine which can be adjusted to precut different lengths of tape.

Still another object of this invention is to provide a taping machine which will extend a new length of tape after each previous length has been applied.

It is yet another object of this invention to provide a taping machine which by reason of novel tape extending structure and its accompanying air blast consistently provides a length of tape extending in a given direction for each application of tape.

It is yet another object of this invention to provide a taping machine which by reason of a novel knurled surface holds tape securely on a vertically moving element then moves the tape into the path of the object to be taped.

Still another object of this invention is to provide a taping machine which by reason of a novel arrangement of rubber rollers, some of which are spring loaded and between which the object to be taped is forced prior to wrapping the tape, securely applies the end of the tape to an object to be taped and then rapidly rotates the rest of the tape around the original point of attachment to tape securely a group of wires or the like together.

Still other objects are inherent in the specific structures shown and described herein.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

FIGURE 5 is a view similar to FIGURE 4 showing a still further step in the cycle of wrapping following that illustrated in FIGURE 4; FIGURE 5 is drawn to the same scale as FIGURE 4 with broken lines illustrating hidden and repetitious parts;

Figure 1:
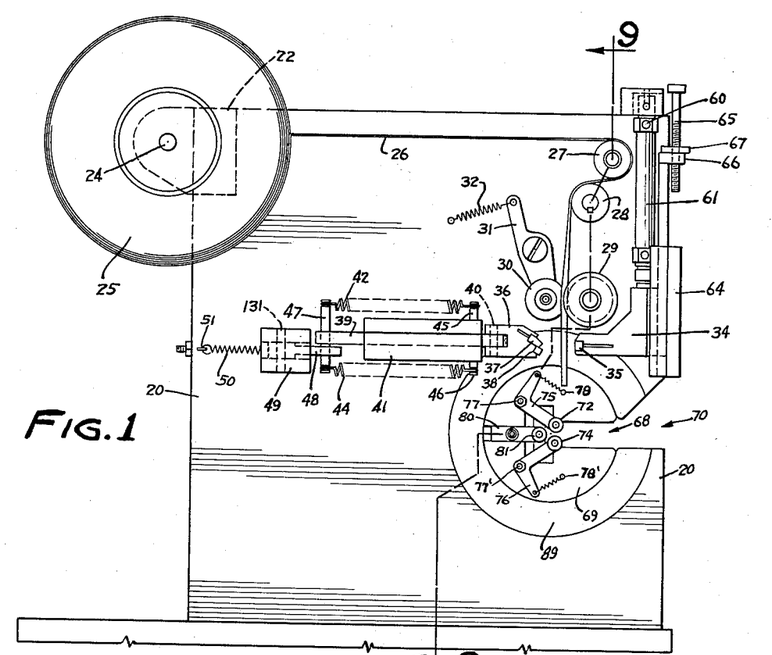
FIGURE 1 is a side elevation of the machine with broken lines illustrating hidden and repetitious parts.

Referring now to the drawings and particularly to FIGURE 1, the machine is provided with a frame which conveniently takes the form of a plate 20 that may be supported in any suitable manner as by the horizontal member 21. Suitably mounted as on brackets 22 and axle 24 is a spool of tape 25. Tape 26 is drawn from roll 25 with its non-adhesive back down and the pressure sensitive adhesive facing up so that when it engages idler 27 it does not adhere thereto. Tape 26 is then carried back around a tape measuring roller 28, to which it does adhere lightly, the rotation which actually determines how much tape is drawn from spool 25 during each operation of the machine. From the measuring roller 28 the tape extends between a V-wheel 29 which is also driven and a disc idler 30 which is mounted on pivoted arm 31 under the tension of spring 32. Idler 30 yieldingly engages V-wheel 29. The inter-action of idler disc 30 with V-wheel 29 places a longitudinal crease in the tape which tends to provide it with longitudinal rigidity after the manner of a flexible steel tape of the type that becomes slightly curved in cross section, as it is drawn from its housing.

After a specific length of tape is measured by the predetermined rotation of measuring wheel 28 it extends down between the anvil support 34 which carries the removable anvil 35 and the cut off head 36 carrying the removable cut off tool 37 and yielding pressure pad 38. Yielding pressure pad 38 may be advantageously made from rubber or the like and serves the purpose of sticking a severed portion of tape to a portion of the support 34, as will be explained in more detail below. V-wheel 29 is driven at the same speed as measuring wheel 28 but, being larger in diameter than the measuring wheel 28, constantly slips slightly over the surface of the tape to which it has been exposed. For this reason, tape 26 will seldom adhere to V-wheel 29 as far as to follow it around in the direction of rotation.

Figure 8:
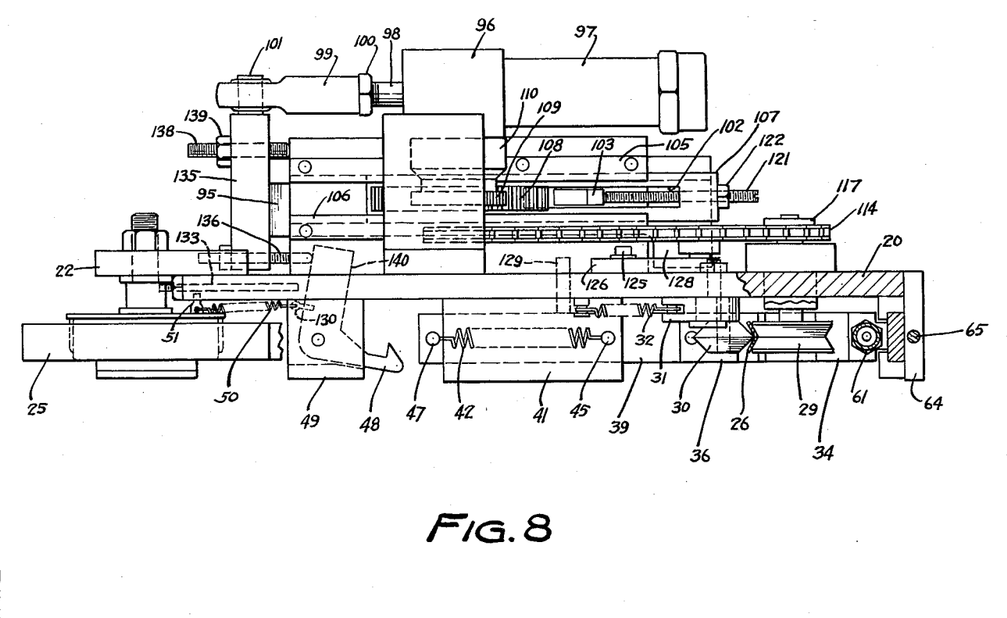
FIGURE 8 is a plan view of the structure drawn to the same scale as FIGURE 2 with portions of the structure broken away to illustrate its construction more fully; broken lines illustrate repetitious elements in part.

Cutting head 36 is suitably secured to a connecting rod 39 in any appropriate manner as by the pin 40. Connecting rod 39 slides in bearing block 41 and is propelled by any suitable means such as the springs 42 and 44. These springs are anchored on pins 45 and 46 which are fixed to bearing block 41. A pin 47 extends through the end of connecting rod 39 and engages the other ends of springs 42 and 44. Pin 47 is engaged by the latch 48 which is pivoted in block 49 in any suitable manner. It is spring loaded to the holding position, as shown in FIGURE 1, by means of a spring 50. Eye 51 is an appropriate anchor point for spring 50. Connecting rod 39 is drawn back to the latched position as shown in FIGURE 1 by structure on the back of frame 20 and will be discussed in connection with FIGURES 8 and 9. For the sake of the present discussion, it is sufficient to state that the connecting rod is drawn back and latched in a position with springs 42 and 44 under tension.

Figure 2:
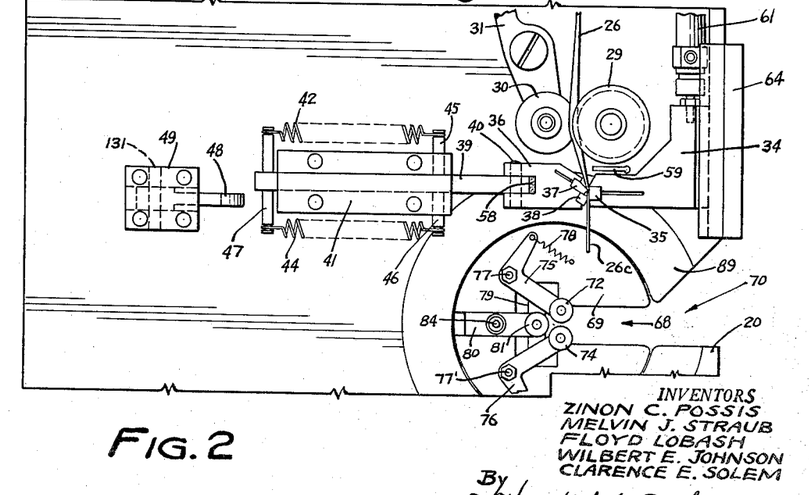
FIGURE 2 is an enlarged fragmentary portion of the structure shown in FIGURE 1 with the parts illustrated at different phases of the operation; broken lines illustrate hidden and repetitious parts.
Figure 14:
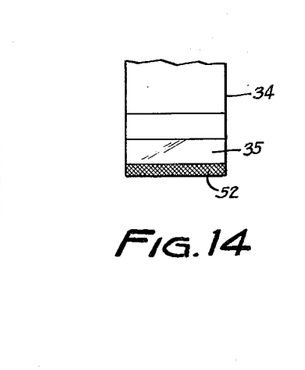
FIGURE 14 is a fragmentary view of the cutting anvil and holding structure taken on the line 14—14 of FIGURE 13; it is drawn to the same scale as FIGURES 4 and 13.

When tape 26 has been advanced as shown in FIGURE 1, mechanism (again on the reverse side of frame 20 and described below) triggers release catch 48 and allows frames 42 and 44 to drive the connecting rod and cutting head forward to engage the tape and carry it against the anvil supporting member as shown in FIGURE 2. When cutting tool 37 engages anvil 35, the tape 26 is cut, and simultaneously pressure block 38 forces the tape against a portion 52 of anvil support 34 which is knurled or uneven as is plainly shown in FIGURE 14.

Figure 13:
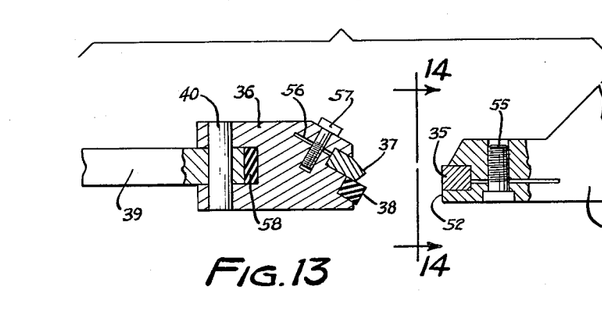
FIGURE 13 is a fragmentary view of the cutting and holding structure with portions of the device broken away to illustrate its construction more fully; broken lines are used to show connecting structure (this view is drawn to the same scale as FIGURE 4)

At this point it may be well to point out that anvil support 34 is provided with a slot 54 which permits a screw 55 to pull together the two portions of anvil support 34 on either side of the slot so as to hold tightly anvil 35. This may be clearly seen in FIGURE 13 where a similar structure is provided for the cutting head 36, it having slot 56 and screw 57 for securing the cutting tool 37 therein removably. In the same view it can also be seen that connecting rod 39 has a resilient cushion 58 interposed between its end and the cutter block 36. This is a shock absorbing structure.

As soon as tape 26 has been severed by the cutting tool 37 and secured to the anvil support 34 by pressure pad 38, the cutting head is withdrawn by mechanism to be explained later and relatched as shown in FIGURE 1. It will be seen from an examination of FIGURE 2, however, that tape 26 has been carried partially around the wheel 29 in the process of being carried over to be severed. For this reason more pressure has been applied to the tape against the surface of wheel 29 than occurs during the measuring out of a length of tape, and recommencing the rotation of wheel 29 with the tape thus pressed against it might well permit the tape to be carried around the wheel 29 instead of extended out straight as shown in FIGURE 1. To assure that no such result occurs, an air blast is issued at this time from nozzle 59 which carries the tape 26 away from the wheel 29 and tends to straighten its end.

Figure 3:
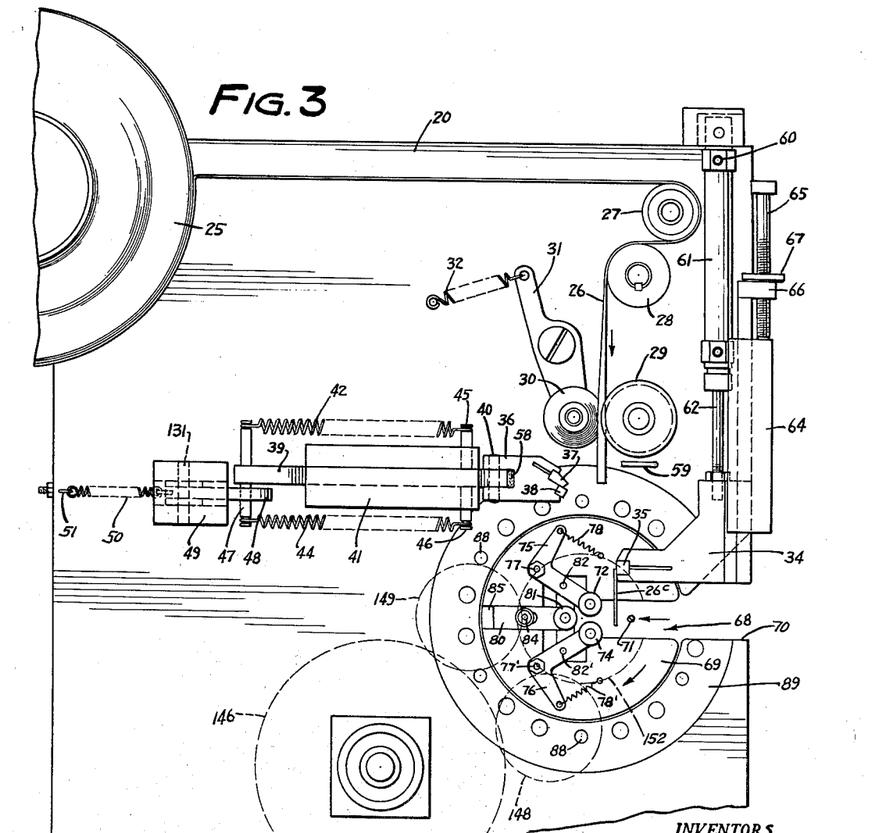
FIGURE 3 is a view similar to that of FIGURE 1 but drawn to the same scale as FIGURE 2 and showing still further steps in the cycle of operation of the machine; broken lines illustrating hidden and repetitious parts.

It can also be seen in FIGURE 2 that the engagement of cutting tool 37 and pressure pad 38 with the tape and against the anvil 35 and support 34, respectively, has straightened the tape extending below the cutoff point. The tape below cutoff is 26c. The same air supply that supplies the air blast for nozzle 59 also is allowed to enter port 60 at the top of air cylinder 61 whereupon connecting rod 62 is extended and carries the anvil support 34 down to the position shown in FIGURE 3. The anvil support slides in the track 64. An adjustable stop screw 65 which is threaded in ear 66 of the anvil supporting structure 34 and which is provided with a jam nut 67 determines how far down air cylinder 61 may carry the anvil support. Set screw 65 will be seen in FIGURE 3 to be engaging the top of slide 64 and thus limiting the downward stroke of the anvil support structure 34.

Figure 4:
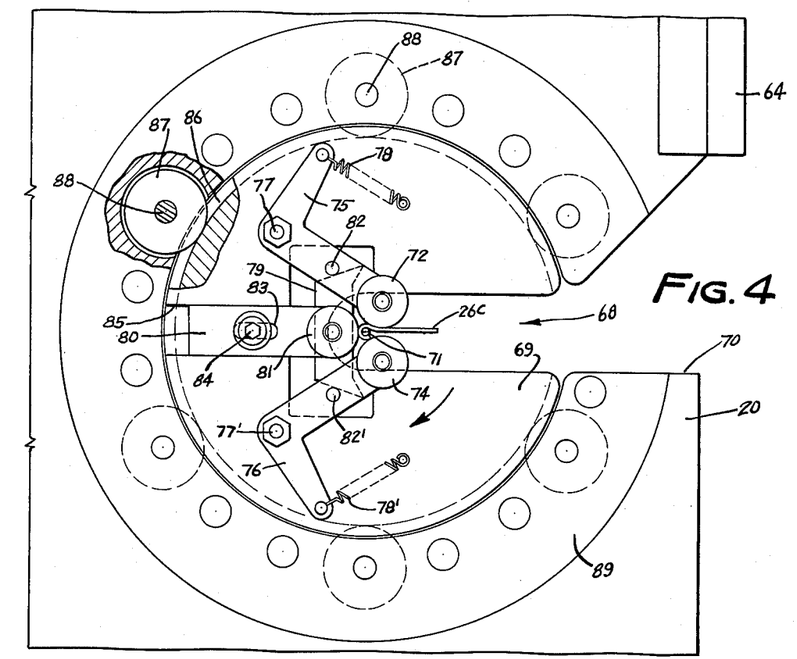
FIGURE 4 is a fragmentary side elevation of the structure shown in FIGURE 3 and drawn to a still larger scale; it shows the structure in a different phase in the cycle of wrapping; broken lines show hidden and repetitious parts; portions of the device are broken away to illustrate the construction more fully.

As seen in that figure the severed piece of tape 26c is extended down and held across opening 68 of the wrapper carrier 69. This opening in the wrapping carrier coincides with an opening 70 in frame 20 to permit the passage through the frame and into the wrapper carrier of wires 71 which are to be taped. As wires 71 are carried into the openings in the frame and the carrier, they engage the piece of tape 26c on its sticky side and adhere thereto tightly enough to pull the severed portion of tape 26c free from the narrowed surface 52. Further inward movement of the wires 71 with tape 26c adhered to them causes the tape and wires to engage the two spring rollers 72 and 74. These rubber rollers are carried on the arms 75 and 76 respectively each of which is pivoted to the carrier as at 77 and 77'. Suitable resilient means such as the springs 78 and 78' urge these two rollers toward each other as far as their respective stop pins 82 and 82' will permit. Movement of arms 75 and 76 determined by wedge member 79 which is secured to the slide 80 which carries the stationary rubber roller 81. There is a slot 83 in slide 80 and a cap screw washer assembly 84 that can fix its position with respect to carrier 69. Slide 80 is movably arranged in the ways 84 and may be moved back and forth therein; whenever the lock assembly 84 is released, slide 80 can move in ways 85. As slide 80 is moved to the left as shown in the FIGURES 1, 3 and 4, wedge 79 is also moved to the left which causes the stops 82 and 82' to engage its surface and their respective rollers 72 and 74 are more widely spaced than would otherwise be true. The reverse occurs when slide 80 is moved to the right. Thus the adjustment of the stationary roller 81 determines the end position of all three rollers with respect to the center point of the carrier 69. At the same time rollers 72 and 74 may yield outwardly in response to pressures exerted from the front or inside. As wires 71 are moved into engagement with the two rollers 72 and 74 they yield and allow the wires 71 with tape 26c to be engaged in the center of the three rollers as shown in FIGURE 4. This initial movement of the wire between rollers 72 and 74 causes the rollers to press the end of tape segment 26c tightly around the wires as shown in that figure.

Figure 6:
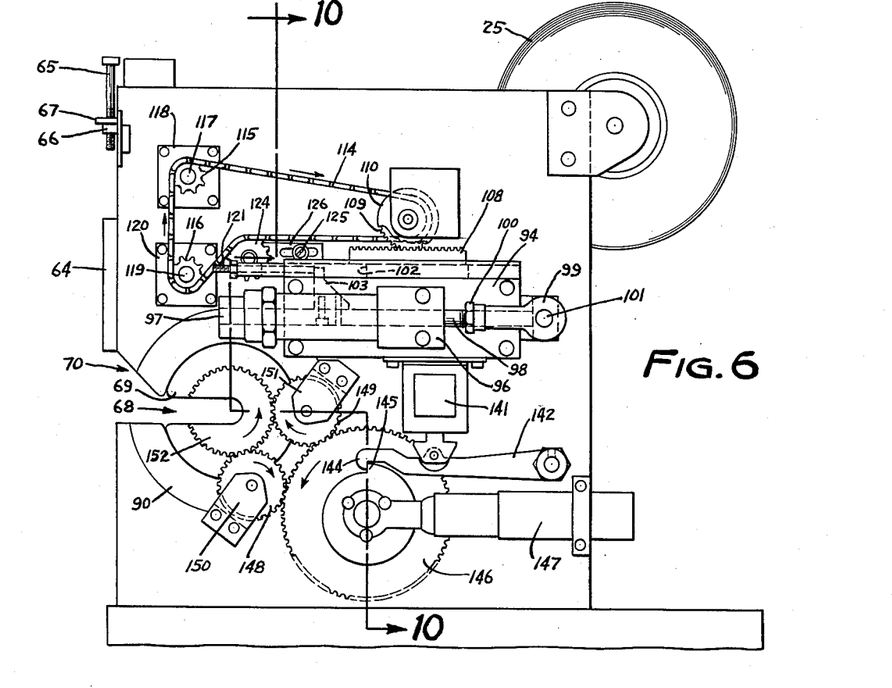
FIGURE 6 is a side elevation of the machine from the opposite side of that shown in FIGURE 1 and drawn to the same scale as that figure; broken lines illustrate hidden and repetitious parts.
Figure 9:
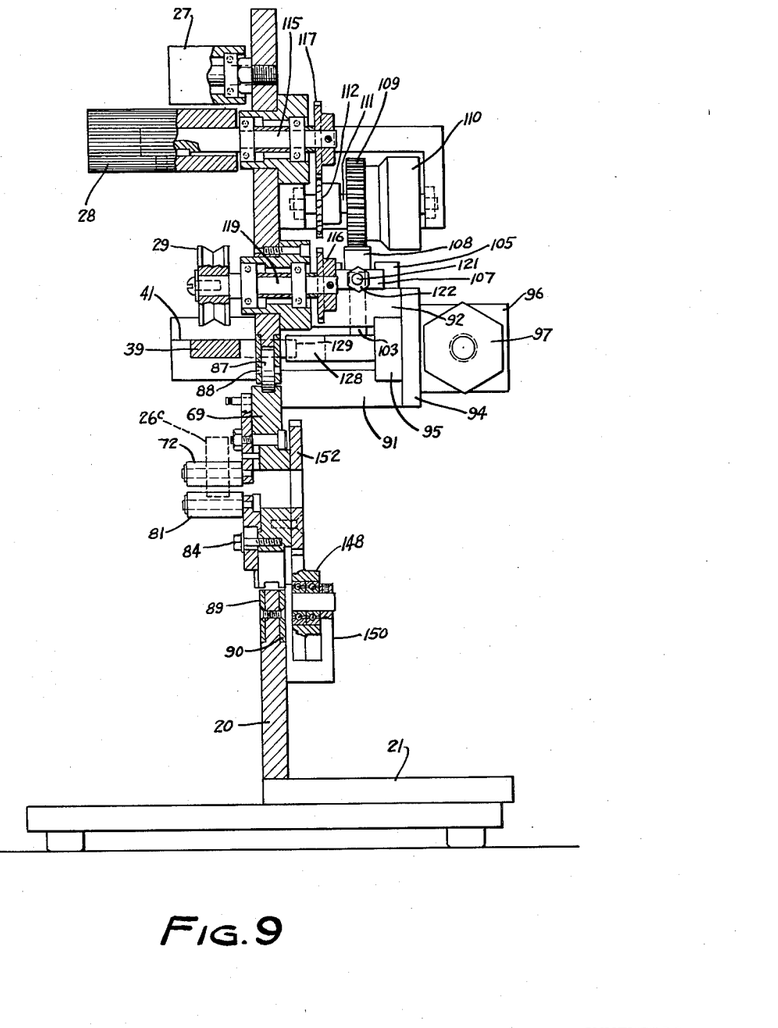
FIGURE 9 is a vertical sectional view taken on the line 9—9 of FIGURE 1; broken lines illustrate hidden parts and a portion of the device is broken away to illustrate its construction more fully (FIGURE 9 is drawn to the scale of FIGURE 2)
Figures 10, 11:
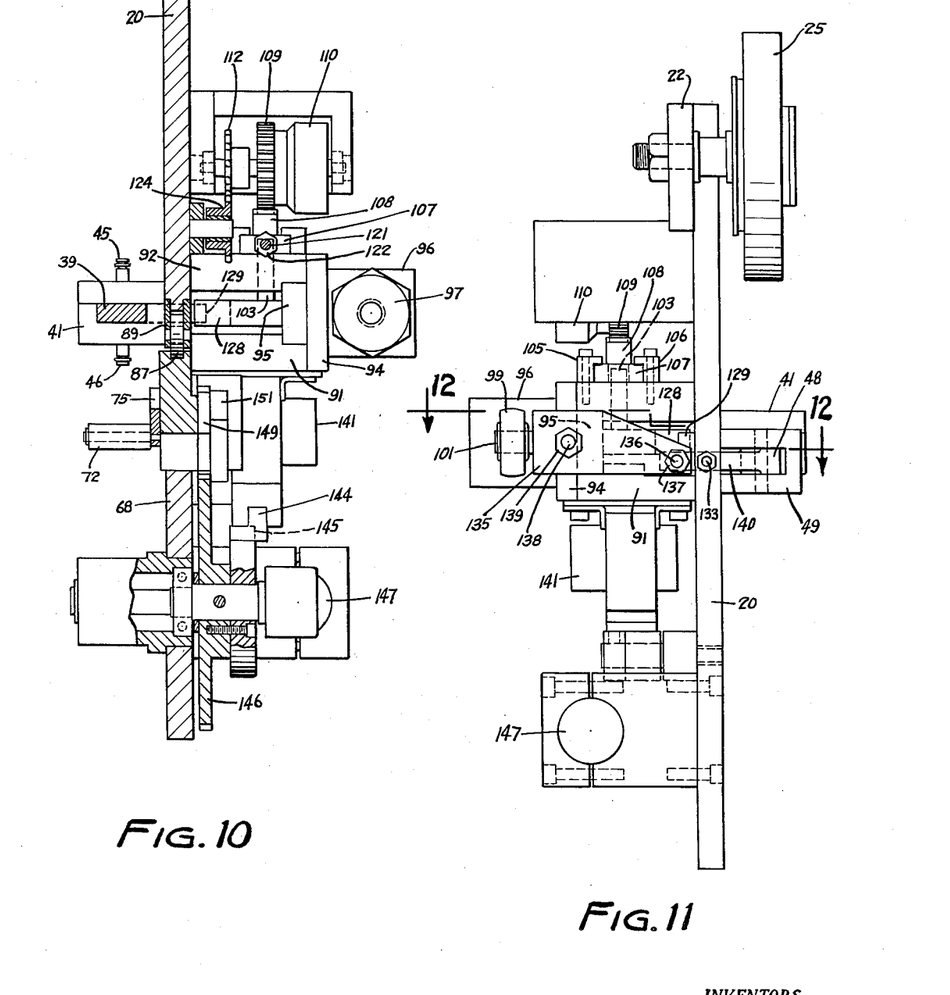
FIGURE 10 is a vertical section taken on the line 10—10 of FIGURE 6 but drawn to the scale of FIGURE 2; broken lines illustrate hidden parts and portions of the device are broken away to illustrate its construction more fully.
FIGURE 11 is a left end elevation of the structure shown in FIGURE 1 and drawn to the scale of FIGURE 2; portions that are hidden are shown in broken lines and parts of the device have been omitted for clarity.

Carrier 69 is provided with a groove 86 at its outer edge which allows the carrier to be cradled by a plurality of rollers 87 that are rotatably supported as at 88 in the retaining plates 89 and 90 (FIGURES 6 and 9). There is a plurality, preferably six, of these rollers spaced around the carrier 69 so that there will be no roughness in its rotary movement when opening 68 moves by any one of the rollers.

Figure 15:
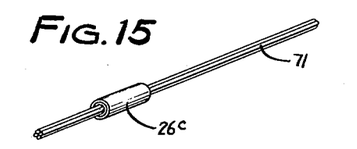
FIGURE 15 is a perspective of a group of wires that have been taped by the machine.

With the structure positioned as shown in FIGURE 4, mechanism is triggered, as will be described in detail later, which rotates carrier 69 as shown by the black arrow in that figure. As tape 71 is held stationary and the rubber rollers 72, 74 and 81 are rotated by the carrier around it, tape segment 26c is wrapped sungly around wire 71 to produce the finished product shown in FIGURE 15.

Figure 5:
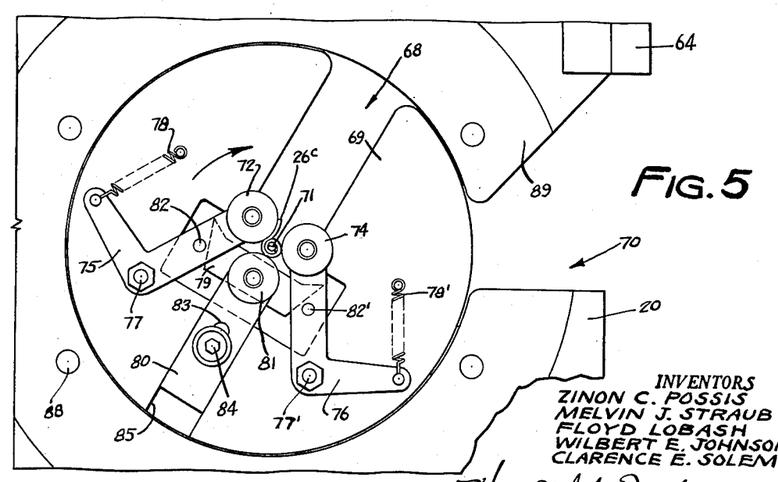

As shown in FIGURE 5, as the tape builds up on wire 71, stop pins 82 and 82' have moved away slightly from wedge element 79 because the thickness of the tape has caused outward movement of arms 75 and 76. With the completion of the tapewrapping operation, the carrier 69 is stopped in the position shown in FIGURE 4 and the wire bundle 71 is taped. Wire bundle 71 is removed by simply forcing it past the spring loaded rollers 72 and 74.

The mechanism for operating this tape applying machine as described above is perhaps most easily explained with reference to FIGURES 6, 7, 8 and 9. As seen in FIGURE 9, there is a pair of way blocks designated 91 and 92 respectively, which together with plate 94 provide a slideway for a T-shaped in cross-section slidebar 95 and which will be hereafter referred to as T-slidebar to distinguish it from others.

Turning now to FIGURE 6, plate 94 also supports immovably a block 96 to which is rigidly secured the reversible, linear motion air motor 97. Motor 97 is provided with a connecting rod 98 which has a connecting eye structure 99 threaded to the end of it and held in any desired adjusted position in a suitable manner as by jam nut 100. A suitable pin 101 connects eye member 99 to the end of T-slide 95. Whenever the motor 97 extends or retracts therefor, T-slide 95 is carried with it. Way block 92 has an opening 102 formed in it through which extends the finger 103 that is secured to the T-slide 95. This may be observed in FIGURES 7 and 9 best perhaps. Finger 103 engages and drives the rack slide which will now be described.

Referring again to FIGURE 9 there will be seen on top of way block 92 a secondary way block 105. There is a similar block 106 spaced from it and just a tip of which may be seen in FIGURE 9. Between these two auxiliary way blocks and the top of way block 92 slidably confine the rack slide 107. A rack 108 is secured to the rack slide 107 and engages the gear 109. Through a ratchet mechanism housed at 110, gear 109 is driven with leftward movement of rack 108 as viewed in FIGURE 6. The ratchet drive connects gear 109 through shaft 111 to gear 112. Gear 112 is rotated when the rack 108 moves to the left as viewed in FIGURE 6 and drives chain 114. As seen in FIGURE 6, the two sprockets 115 and 116 are engaged by chain 114 and are rotated in the direction of the black arrow to the left of those two sprockets. Sprocket 115, mounted on a suitable shaft such as 117 and journaled properly in a bearing supported by bearing plate 118, drives the tape measuring roller 28. The sprocket 116, secured to the shaft 119 which is journaled in a bearing plate 120, is connected to and drives the V-wheel 29. Thus the distance the rack 108 is moved determines how much tape 26 is withdrawn from roll 25.

Figure 7:
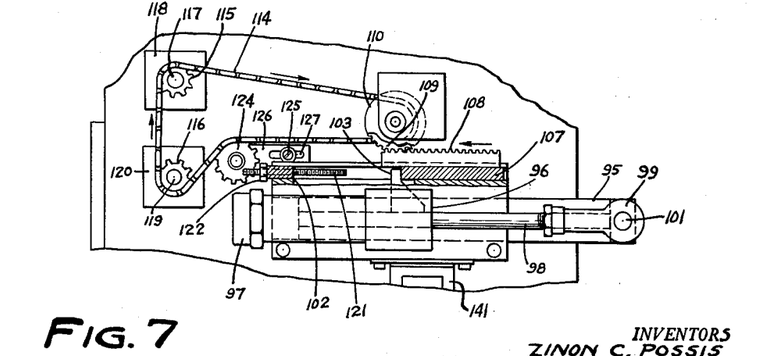
FIGURE 7 is a fragmentary view of the same structure seen in FIGURE 6 with an adjusted position of those parts shown; broken lines illustrate hidden parts.

As shown most clearly in FIGURE 7, limit screw 121 which is threaded into the rack slide 107 and secured in an adjusted position by the jam nut 122 determines how soon the rack slide commences to move with movement of the T-slide 95 carrying finger 103. From the position shown in FIGURE 7 substantial movement of T-slide 95 occurs before finger 103 engages the end of the limit screw 121. It is not until the limit screw is engaged that movement of the rack commences, as shown by the black arrow in FIGURE 7, and tape is measured from the roll. By turning screw 121 as to bring its end nearer to finger 103, a greater length of tape is measured out. Withdrawing screw 121 farther to the left as viewed in FIGURE 7 causes a shorter piece of tape to be measured.

Tension on chain 114 is maintained by an adjustable idler 124 which is held in the correct position against chain 114 by means of the set screw 125 which secures a slidably mounted bracket 126 in place. By loosening set screw 125 bracket 126 may be moved within limits set by slot 127.

Figure 12:
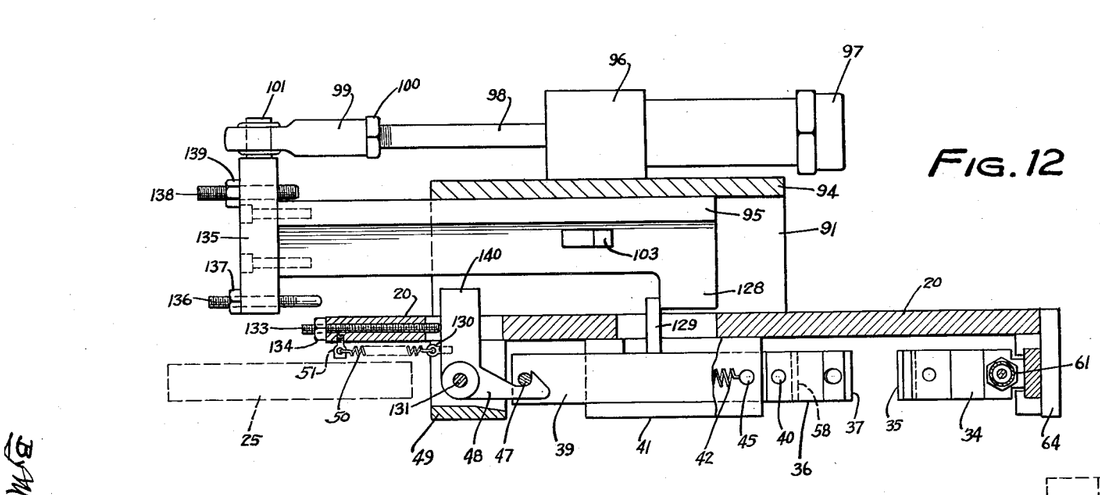
FIGURE 12 is a horizontal section taken on the line 12—12 of FIGURE 11; broken lines illustrate hidden and repetitious parts.

As seen most clearly perhaps in FIGURE 12, T-slide 95 has a projection 128 thereon which engages a boss 129 of the cutoff connecting rod 39. Whenever motor 97 moves to the left as shown in FIGURE 12 therefor, the projection 128 engage boss 129 and draws the connecting rod back until the pin 47 is caught and held by latch 48. As seen in FIGURE 12 the spring 50 secured to frame 20 by means of eye 51 is secured to the latch suitably by a similar eye 130. Latch 48, pivoted as at 131 in bracket 49, will hook and hold in a cocked position the cut-off connecting rod. A limit screw 133 that is secured in place by a jam nut 134 determines the position of the latch 48 when retained, urged by spring 51.

The end bar 135 of T-slide 95, to which the connecting eye member 99 is actually secured in any suitable manner as by the pin 101, carries in it a trigger screw 136 which is held in an appropriately adjusted position by jam nut 137. Also in end bar 135 is stop screw 138 having a jam nut 139. Stop screw 138 limits or determines the length of stroke possible with motor 97 in the left hand direction of movement as shown in FIGURE 12. Trigger screw 136 engages inner end 140 of latch 48 in order to pivot it against the tension of spring 50 and thereby release pin 47 at the inner end of the right hand stroke of the motor 97 as viewed in FIGURE 12. When the motor has completed a stroke toward FIGURE 12 (or toward the left in FIGURE 6), it will be recalled that the tape has been extended out the appropriate distance. At the very instance when the tape is appropriately extended, trigger screw 136 releases latch 148 and the springs 42 and 44 drive the cutoff bar forward as described above.

When the tape 26c has been engaged by the wires 71 and carried between the rollers 72, 74 and 81 to the opening 68 in carrier 69, it is desired to rotate carrier 69. At this juncture, an appropriate electrical control which will be described in connection with the wiring diagram, causes current to be supplied to the electromagnetic actuator 141. When it is actuated, it lifts the lock 142 and disengages the dog 144 from the lock cam 145. The cam and gear are secured together and connected to a suitable source of rotary power here shown as an air motor 147 which is connected to the cam and gear through an appropriate gear reduction structure. With the release of the dog 144 from the lock cam therefor, gear 146 is rotated in the direction of the black arrow shown thereon in FIGURE 6 by air motor 147. Immediately gear 146 begins rotating the two idler gears 148 and 149 which are suitably journaled in the frame and brackets 150 and 151, respectively. These idler gears engage a fragmentary gear 152 which is rigidly secured to the roller carrier 69. Because there are two idlers, 148 and 149, the interruption of fragmentary gear 152 by the opening 68 to permit the entrance of the wire to be taped does not interrupt driving of the wire carrier. In this particular application of taping it is desirable to have two rotations or revolutions of the wrapping mechanism around the wire. The fragmentary gear 153 therefore has a circumference one-half that of gear 146. One complete rotation of gear 146 therefore produces two revolutions of fragmentary gear 152. Almost immediately after arm 142 is raised by electromagnetic actuator 141 and the lock cam 145 and gear 146 begin to rotate, the electromagnetic actuator 141 is de-energized and dog 144 again falls down against the surface of cam 145. Upon one complete rotation of gear 146, therefore, the lock cam engages dog 144 to stop the wrapping mechanism after two revolutions in the home position shown in FIGURE 6.

Figure 16:
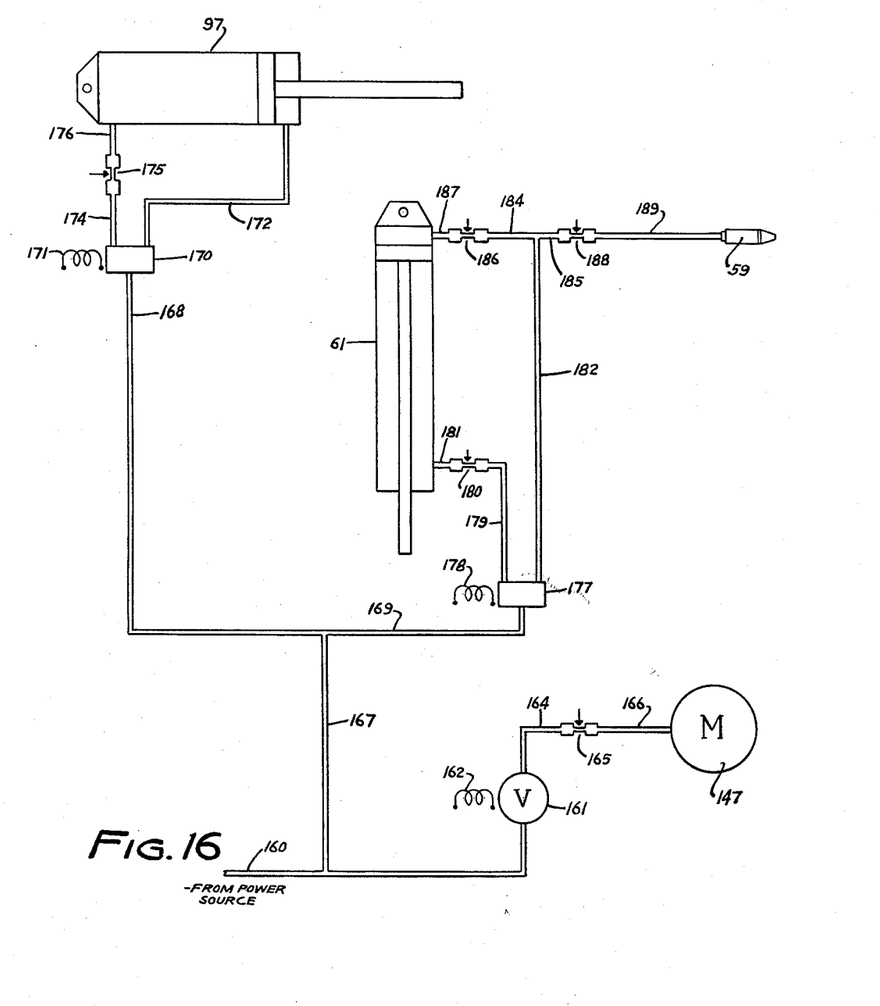
FIGURE 16 is a diagram of the pneumatic circuit.

Referring now to FIGURE 16, which is a diagram of the pneumatic circuit for the machine, the line 160 connects to any suitable, regulated source of air pressure (not shown). Line 160 extends to a valve 161 which is controlled by a coil 162 which when energized opens the valve. The valve is closed by spring tension when the coil 162 is de-energized. Line 164 connects valve 161 to a variable resistance orifice 165. A line 66 connects the variable orifice 165 to the air motor 147. Coil 162 is energized whenever the machine is in operation to provide a constant source of air under presure to motor 147. Its rotation is controlled by cam lock 145 and dog 144 as described above.

A line 167 branches from line 160 and is also supplied with air from the source. Line 167 conducts air to the two lines 168 and 169. Line 168 is the pressure line to a distributor valve 170 which is operated by a coil 171. Line 172 connects distributor valve 170 to one end of linear motion motor 97 to cause it to move in the direction of the tape. Line 174 connects distribution valve 170 to a variable orifice 175 which via line 176 is connected to the other end of the linear motion air motor 97. When air is provided to this line, the air motor drives T-slide 95 in the direction of preparing the tape feed for another cycle and cocking the cut-off mechanism. When coil 171 is not energized, a spring moves the distribution valve in a position which connects line 168 to line 174 and line 172 to the atmosphere. When power is supplied to coil 171, the connection within the distribution value is reversed and line 172 is connected to line 168 while line 174 is vented.

Line 169 connects distribution valve 177 to the air supply via lines 167 and 160. Valve 177 is provided with an acuating coil 178. The distribution valve is also connected by means of line 179 to a variable orifice 180 and the orifice by line 181 to the end of cylinder 61 which raises the anvil support mechanism. A second line 182 supplies air power under certain circumstances discussed hereafter to lines 184 and 185. Line 184 via variable orifice 186 and line 187 is connected to the upper end of cylinder 61. When air pressure is supplied to this line the anvil support mechanism is carried down and places tape in the path of an article to be taped. Line 185 via variable orifice 18 is connected via line 19 to nozzle 59. When coil 170 is not energized a spring causes it to connect line 169 via the valve 177 to line 179. At the same time, line 182 is vented to the atmosphere. Under these circumstances, the anvil support member 34 is raised. When coil 178 is energized, its magnetic effect overcomes the spring and reverses the connection within the valve 177. Line 169 is then connected to line 182 and line 79 is vented to the atmosphere. When presure is supplied to line 182 the nozzle 59 is supplied with air via line 185, orifice 188 and line 189, which provides the air blast blowing the end of the tape that remains secured to the tape supply free from the anvil support mechanism. At the same moment, air pressure is being built up in cylinder 61 via line 184, orifice 186 and line 187 to cause the connecting rod 62 to carry the anvil support mechanism down and thus place the tape across the openings 68 and 70 in the spinner carrier and frame respectively.

Figure 17:
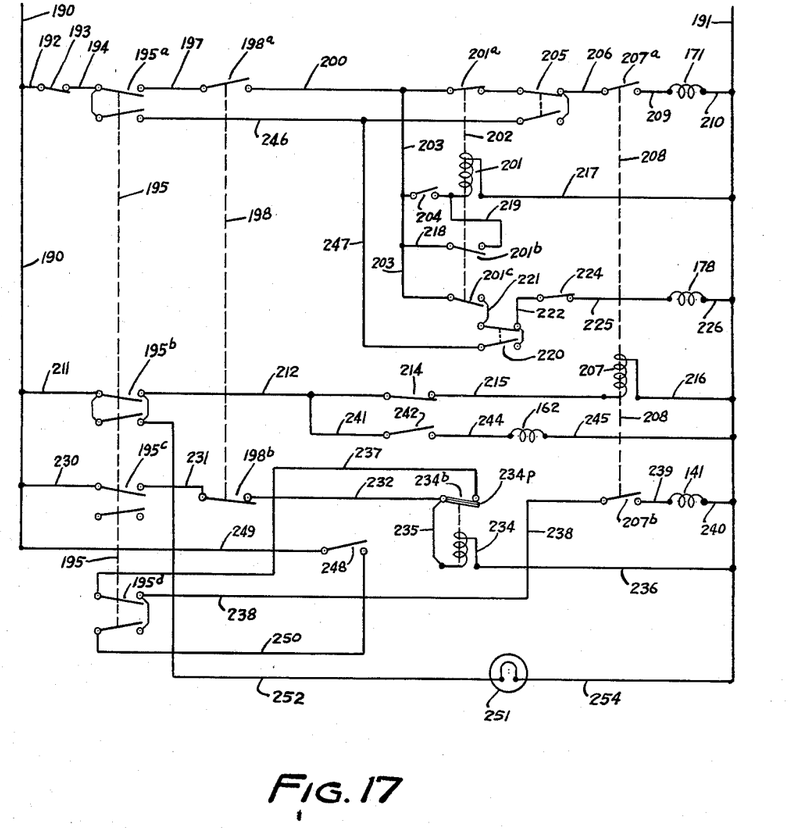
FIGURE 17 is a diagram of the electrical circuit.

Turning now to FIGURE 17, which is the electrical diagram for the machine, power is supplied via the lines 190 and 191. Lead 192 connects the switch 193 to line 190. Switch 193 is a safety or tie-in switch which prevents the commencement of taping unless the carrier for the tape wrapping roller is in the home or open position as shown in FIGURES 1 and 2, for example. Whenever the carrier is in a position other than that shown in FIGURES 1 and 2, switch 193 stands open. When the carrier reaches the home position this switch is closed, as shown in the diagram. Switch 193 is connected by line 194 to the power terminals of one portion of the switch 195. Switch 195 is a gang switch having several sets of contacts. This switch is a manually operated main control switch having an off position (as shown in FIGURE 17), a manual position and an automatic position. Broken line 195 is the mechanical linkage by means of which all the contacts are actuated together. The contact portions of this main switch are designated 195a, 195b, 195c and 195d. All of the portions are connected across the upper terminals when the switch is turned to the position marked automatic and to the lower terminals when the switch is turned to the position marked manual. As shown in the drawings, the switch is in the "off" position. Contacts 195a are those to which line 194 connects. This same portion of the switch is connected by line 197 to a foot switch and particularly to the contacts thereof designated 198a. It is a two-part switch, the other portion of which is 198b. The switch is designated generally as 198 which number is applied to the mechanical linkage represented by the broken lines in diagram 17. As shown in the drawings switch contacts 198b are closed and 198a are open. Each time the switch is actuated, this condition of the contacts is reversed.

Line 200 connects switch contacts 198a to one portion of a multiple point relay, the coil of which is designated 201. The points operated by this coil, to which line 200 connects, are designated 201a. Other points operated by coil 201 are 201b and 201c. In a de-energized position, as shown in the drawings, points 201a are spring loaded closed while the other points, 201b, 201c are open. Mechanical linkage represented by broken line 202 connects all of the points 201a, b and c together for joint operation.

The line designated 203 is joined to line 200 and whenever line 200 is energized line 203 supplies the power to line 201, 201b and 201c.

Switch 204 is a spring loaded open switch which is actuated by the operation of the tape feed driving mechanism and at the end of the feeding stroke closes it to provide current for coil 201. Coil 201 when actuated moves all of the switches 201a, 201b and 201c to the opposite position of that in which they are shown in FIGURE 17. Specifically 201a is opened and 201b and c are closed.

A lead connects the switch points 201a through double pull switch 205 which as shown in the diagram is in a position to which it is spring loaded but from which it may be moved manually if the tape feeding operation is to be carried on by manual control rather than automatic. A lead line 206 connects the other side of this switch to a relay point set up system 207a. This set of relay points is one of two for a relay, the coil of which is designated 207.

A second set of points designated 207b is also actuated by the same coil and a broken line designated 208 shows the mechanical connection between the two sets of points and the coil. A line 209 connects the points 207a to coil 171 which is the coil for the valve that actuates the tape feeding mechanism. This valve is number 170 on the pneumatic diagram. Another lead line 210 connects the other side of coil 171 to the return power lead 191. In order to feed tape, therefor, relay points 207a must be closed which is accomplished as follows.

Power lead 190 is connected by lead 211 to the portion 195b of switch 195. Line 212 connects the other side of switch contacts 195b to a safety or limit switch 214 which is spring loaded closed whenever the mechanism for supporting 34 for tape cutting anvil is in an up position. This would be the case at the beginning of a cycle and hence switch 214 is closed. A line designated 215 extends from switch 214 to coil 207 and a line 216 completes the circuit for that coil to the other of power line 191.

Consequently with the turning of switch 195 to the automatic position and with the handle supporting mechanism up, relay coil 207 is energized. As soon as this coil is energized, the switch point relay points 207a are closed and thus a circuit is completed through line 190, line 192, switch 193, line 194, switch contacts 195a, line 197, switch contacts 198a, line 200, relay points 201a, switch contacts 205, line 206, relay points 207a, line 209, through the coil 171, line 210, and finally to the other power line 191. This circuit energizes coil 171 and moves valve 170 to cause a tape feeding action to occur.

As pointed out above, however, as soon as tape feeding action has been completed, limit switch 204 is closed to apply line power to coil 201. A line designated 217 connects the other side of coil 201 to the return line 191. Mechanical linkage actuates all the points 201a, b, and c simultaneously to a position opposite to that shown in the diagram. Line 203 continues from line 200 down and connects to relay points 201c. A branch lead designated 218 supplies power from line 203 to relay points 201b. Another line 219 connects the other side of relay points 201b to the same terminal of coil 201 that switch 204 supplies power to. Thus, whenever the switch 204 originally energizes the relay coil 201, its points 201b provide a holding circuit via the lines 218 and 219 to continue to supply power to the coil and hold it in an energized position. For this reason the circuit to coil 171 is not only interrupted by opening points 201a when tape feeding has been completed, but it is held interrupted by the holding of the relay coil 201 via points 201b.

At the completion of the tape feeding stroke, the cutter head is also released mechanically, as described above, and flies forward to cut the tape. This mechanism is withdrawn and recocked, however, when coil 171 is de-energized as described in the preceding paragraph and valve 170 under spring tension directs air pressure to cause air cylinder 97 to return.

While relay coil 210 is thus acting to recock the cut-off mechanism and prepare the tape feeding structure for another stroke, a circuit is provided for the coil 178 via switch 220, which is held as shown by spring tension, through a jump lead 221 from points 201c, another lead 222, safety switch 224, lead 225 and lead 226 to the other power lead 191. Safety switch 224 is open under spring tension unless the cutoff mechanism is back and cocked. Thus the tape 26c is lowered only if the cutting head is retracted. Since coil 178, when energized, provides air power to air blast nozzle 59 as well as cylinder 61, the air blast will be in operation also whenever coil 178 is energized.

As tape 26c is lowered, the safety switch 214 is forced open and held open until such time as the tape carrying the anvil supporting structure 34 is returned to a raised position. Furthermore, as long as switch contacts 198a remain closed, current will be supplied to the coil 178 and the anvil supporting structure will continue to remain in down position. At this point the wires 71 or other object to be taped are inserted through the openings 70 and 68 in the frame and carrier respectively to engage tape 26c. As shown herein, this step is carried out manually. The tape sticks to the object and is carried thereby between the rollers as described above and in this position is ready to be wrapped. At this point the operator steps on foot switch 198 and in so doing opens points 198a and closes point 198b. The actuation of foot switch 198 in opening of points 198a interrupts the circuits to relay coils 201 and 178. Spring load of the relay 201 opens points 201b and 201c while closing 201a. Power to the coil 178 of the valve 171 also is supplied via contacts 198a and is broken by opening those contacts. Spring pressure returns valve 177 to an "up" position as opposed to the "down" position which was held by coil 178.

At the same time, power supplied through line 230 to the switch contacts 195c and line 231 to the switch contacts 198b is connected by the closing of those contacts to lead 232 which connects also to a time delay relay, the coil of which is designated 234. The points of this relay are designated 234p and the bi-metallic portion designated 234b. Whenever power flows through bi-metallic 234b, it becomes warm and curves as the result of the dissimilar expansion of its elements. In so doing it breaks the circuit of points 234p. Coil 234 then holds the bi-metallic in this open position once it has been moved in part as a result of the action of the bi-metallic. At the same time coil 234 is not strong enough to open the relay when power is first applied to the coil through the line 235 that is connected to the line 232. A line 236 connects the other side of coil 234 to the main power lead 191. The opposite side of points 234p are connected via a line designated 237 to a still further set of contacts 195d of switch 195. As this switch will be closed whenever the machine is set for operation, power may pass through the contacts 195d from line 237 to line 238. Line 238 connects to relay points 207b. A lead 239 connects relay point 207b to coil 141 which is shown in FIGURE 6 releases the lock 144 of the spin driving mechanism. A line 240 completes the circuit for this coil to line 191. With the lock 144 released, the air motor 147 will spin the tape wrapping mechanism carrier 69.

Air pressure is supplied to motor 147 continuously when the machine is turned on. A circuit for accomplishing this result is as follows.

Lead 241 is connected to line 212 and supplies it to a manually operated switch 242. Lead 244 connects switch 242 to one side of coil 162. Line 245 provides a connection between the other side of coil 162 and the other power line 191. Switch 242 is closed manually whenever the machine is operated. Consequently valve 161 is constantly providing a path for air to flow from line 160 through valve 161 to the air motor 147 at all times. Mechanically the motor is restrained by the dog latch 144, and it is only when coil 141 is energized and releases the dog that the air motor drives gear 146 one complete revolution to provide two complete revolutions of fragmentary gear 152 and the tape spinner or carrier 69. Shortly after the air motor has begun to rotate the gear 146, however, the time delay points 234p open and coil 234 holds the points 234p in this open condition. Immediately upon this action taking place the circuit via line 237, switch points 195b, line 238, relay points 207b, line 239 and line 240 for the coil 141 is interrupted. Dog 144 immediately returns to rest on the cam lock portion 145 of the gear 146 which stops the air motor when the cam lock 145 again engages dog 144.

At this point the machine is again back at the home position at the beginning of a taping cycle with the carrier 69 as shown in FIGURE 1 but without any tape having been advanced. The circuit at this instant would be as shown in the diagram except that the switch 195 would be turned to the "automatic" position rather than standing in the "off" position as shown in the diagram. The article that has been taped can then be manually removed from between the rubber rollers 74, 72 and 81 which places the machine in condition to receive a second set of wires or other object to be taped. As soon as the operator has removed the taped object, he may again step on foot switch 198 thus producing the tape feeding cycle as described above.

In the event that it is considered desirable to operate the machine under strictly manual control, the control switch 195 is placed in the position of manual, which is to say, the downward position of contacts 195a, b, c, and d as illustrated in FIGURE 17. All of the lower contacts of switch contacts 195a, b, c and d are completed under these circumstances. With switch 195a connected across the lower set of contacts, a line 246 is connected to lead 194 and supplies power to the lower set of contacts for switch 205. The operator manually forces switch 205 to a lower position against its spring pressure and this supplies power directly through the points 207a to coil 171 causing the tape mechanism to feed; and at the end of that stroke of air motor 97, the cut-off is thrown forward to cut the tape. As soon as the operator observes that the tape has been advanced and cut, he releases switch 205, which under spring tension returns to the position shown in FIGURE 17. This interrupts the circuit provided for coil 171 and as a result valve 170 is forced by spring tension to the return and cocked position for the air motor 97.

Line 246 also provides a power via a branch line 247 to manual switch 220. If safety switch 224 has been close dby the cocking of the cutoff mechanism, momentary lowering of switch 220 by manual pressure against its spring load will complete a circuit for the coil 178 of valve 177. Operation of this valve as described in connection with FIGURE 16 causes air cylinder 61 to lower the tape. Again when the operator has observed the completion of the tape lowering and has advanced the tape into the spinner by advancing wires 71 through openings 68—70, switch 220 is returned to the up position which again de-energizes coil 178 and thus permits valve 177 to direct air pressure as to raise the anvil support structure 34 out of the path of the spinner carrier. As pointed out above, the spinner release can only be actuated if the anvil support is up, which causes switch 214 to be closed.

With the tape anvil support structure 34 raised, switch 214 is closed and upon manual operation of switch 248, power is provided via line 249, and line 250, to switch contact 195d. From this point the usual circuit of line 238 and relay point 207b, line 239 and line 240 completes the circuit for coil 141 thus releasing lock 144 for the air motor allowing it to provide the wrapping action for tape roller carrier 69. As soon as wrapping starts, the operator releases switch 248 which de-energizes coil 141 allowing dog 144 to drop back and stop carrier 69 in the home position. The machine is ready for another cycle.

If desired a pilot light 251 may be supplied with power via line 252 and 254 whenever switch point 195b is connected in either direction. This pilot simply indicates that power is being applied to the system, and that it can be operated either manually or automatically.

It is apparent that many modifications and variations of this invention as hereinbefore set forth may be made without departing from the spirit and scope thereof. The specific embodiments described are given by way of example only and the invention is limited only by the terms of the appended claims.

What is claimed:

1. A taping machine comprising a frame, said frame having an opening therein extending through the periphery thereof, a spinner assembly mounted on said frame rotatably adjacent the opening therein, said spinner assembly having an opening therein alignable with the opening of said frame whereby access may be had to the center of said spinner assembly from the exterior of said frame, at least three rollers mounted on said spinner assembly for rotation therewith and distinct from the rotation of said spinner assembly, at least one of said rollers yieldingly secured to said spinner and extending into the opening in said spinner assembly, means for presenting tape across the opening in said frame and spinner assembly, and means for spinning said spinner assembly when said tape and an object to be taped have been forced within the rollers thereof by displacing momentarily at least one yielding roller.

2. The taping machine of claim 1 in which said means for rotating said spinner assembly comprises a constantly powered air motor, a gear secured to and rotated by said motor, idler gears engaging said gear, a fragmentary gear secured to said spinner and engaging said idler gear, a cam on said gear, a dog engaging said cam and stopping it in a fixed position, and electromagnetic means for releasing momentarily said dog secured thereto.

3. The taping machine of claim 2 in which said gear secured to said motor has a circumference that is an even number multiple of the circumference of said fragmentary gear.

4. The taping machine of claim 2 in which said fragmentary gear secured to said spinner assembly is ½ the diameter of the gear secured to said motor.

5. The taping machine of claim 1 in which one of the rollers on said spinner assembly is mounted on a slide, the other rollers of said spinner assembly are mounted on pivoted spring loaded arms, and means secured to said roller mounted on said slide and engaging portions of the pivoted arms carrying the other rollers; whereby all of said rollers move radially away from the center of said spinner when said roller mounted on said slide is thus moved and all moved radially toward the center of said spinner when said roller mounted on said slide is so moved.

6. The taping machine comprising, a frame, tape supplying means on said frame, tape metering means on said frame, a cutoff head slidably secured to said frame, a cutoff tool secured to said cutoff head, an anvil supporting means movably mounted on said frame, an anvil secured to said anvil supporting means, means for advancing said cutoff tool into contact with said anvil, said tape metering means presenting tape with its sticky side toward said anvil, a resilient pad on said tape cutting head, and a knurled surface on said anvil supporting means opposite said resilient pad, and means for moving said anvil supporting means after a portion of tape has been cut.

7. A taping machine comprising, a frame, a tape wrapping means on said frame, tape supplying means on said frame, tape metering means on said frame, a cutoff head slidably secured to said frame, a cutoff tool carried by said cutoff head, an anvil supporting means slidably mounted on said frame for vertical movement thereon, an anvil secured to said anvil supporting means, said tape metering means presenting tape with its sticky side toward said anvil, an air blast nozzle positioned between said tape metering means and said anvil and directed toward said cutoff head, and means for vertically sliding said anvil supporting means from a position spaced above to a position above and nearer said tape wrapping means after a portion of tape has been cut, said means for moving said anvil supporting means and said air blast nozzle being actuated simultaneously.

8. A taping machine comprising a frame, tape supplying means on said frame, tape metering means on said frame, a cutoff tool slidably secured to said frame, an anvil movably mounted on said frame, said tape metering means presenting tape with its sticky side toward said anvil, means for sliding said cutoff tool to engage said anvil and cut a metered length of tape, means for moving said anvil after a portion of tape has been cut, and means between said tape metering means and said anvil for disassociating the severed end of unmetered tape from said anvil before it is moved.

9. The taping machine of claim 8 in which said means for disassociating unmetered tape from said anvil is an air blast nozzle.

10. A taping machine comprising a frame having a circular opening therein, said circular opening at one portion thereof communicating with an opening that extends out through the periphery of the frame, a plurality of rollers pivoted to said frame adjacent to said circular opening and having portions of their edges extending into said opening, a carrier rotatably supported by said rollers, plates secured to said frame on both sides of said opening to retain said carrier within said opening, said carrier having an opening therein alignable with the opening in said frame extending through its periphery, a plurality of rollers movably mounted on said carrier and at least some of which being spring loaded to yield to physical pressure of units to be taped being pressed against them, a tape storage reel on said frame, tape feeding rollers on said frame above said carrier, reciprocating means for driving said tape feeding rollers predetermined distances at intervals, an anvil supporting structure slidably mounted on said frame above said opening and having one face positioned on a vertical line between said carrier and the opening of said frame, a cutting tool head slidably supported on said frame opposite the upper position of said anvil supporting structure, a resilient pad on said cutting tool head, a knurled surface on said anvil supporting structure opposite said resilient pad when said anvil supporting structure is in its upper position, an air cylinder having a connecting rod secured to said frame with its connecting rod secured to said anvil supporting structure for raising and lowering it, an air blast nozzle positioned above said anvil supporting structure and connected to the air supply that actuates said air cylinder to move said anvil supporting structure down, springs secured to said frame and cutoff tool head for driving said cutoff tool against said anvil, said cutoff tool being cocked by one stroke of the reciprocating means for rotating said tape metering rollers, and means for rotating said carrier at least two revolutions and stopping it with the opening in said carrier member aligned with the opening in said frame.

11. The taping machine of claim 10 in which one of the rollers on said carrier is mounted on a slide movably secured to said carrier, the other rollers on said carrier are mounted on spring loaded, pivoted arms, and means secured to said slide and engaging portions of the pivoted arms carrying the other rollers to move said arms away from the center of said carrier whenever said movable roller is so moved.

12. The taping machine of claim 11 in which said means for rotating said carrier comprises an air motor, a gear driven by said air motor, means for stopping said gear driven by said air motor in a fixed position and for releasing it selectively, a pair of spaced idler gears engaging said gear driven by said air motor, and a gear secured to said carrier and having an opening therein, matching the opening of said carrier and engaging said idler gears, said gear secured to said air motor having a circumference twice that of said gear secured to said carrier.

13. The taping machine of claim 12 in which said means for stopping said gear driven by said air motor comprises, a cam secured to said gear driven by said air motor, and a dog engaging said cam, and said releasing means comprises an electromagnetic device secured to said dog, and means for energizing said electromagnetic means momentarily.

14. The taping machine of claim 10 in which said means for rotating said carrier comprises an air motor, a gear driven by said air motor, means for stopping said gear driven by said motor in a fixed position and for releasing it selectively, a pair of spaced idler gears engaging said gear driven by said air motor, and a gear secured to said carrier and having an opening therein, matching the opening of said carrier and engaging said idler gears, said gear secured to said air motor having a circumference twice that of said gear secured to said carrier.

15. The taping machine of claim 14 in which said means for stopping said gear driven by said air motor comprises, a cam secured to said gear driven by said air motor, and a dog engaging said cam, and said releasing means comprises an electromagnetic device secured to said dog, and means for energizing said electromagnetic means momentarily.

16. A taping machine having a tape metering structure and tape cutting structure, a tape holding structure comprising, a knurled surface arranged near said tape cutting structure and on the opposite side thereof from said tape metering structure, and means for pressing severed portions of tape against said knurled surface.

17. The tape holding structure of claim 16 in which said means for pressing tape against said knurled surface comprises a resilient pad secured to said tape cutting structure.

References Cited in the file of this patent
UNITED STATES PATENTS

| | | |
|---|---|---|
| 1,417,956 | Varga | May 30, 1922 |
| 1,837,840 | Slusher | Dec. 22, 1931 |
| 2,632,510 | Doppleb | Mar. 24, 1953 |
| 2,651,900 | Heilman | Sept. 15, 1953 |
| 2,841,935 | Kruiger | July 8, 1958 |